United States Patent
Hashemi et al.

(10) Patent No.: US 10,581,650 B2
(45) Date of Patent: Mar. 3, 2020

(54) ENHANCING ISOLATION IN RADIO FREQUENCY MULTIPLEXERS

(71) Applicant: Qorvo US, Inc., Greensboro, NC (US)

(72) Inventors: Hossein Hashemi, Pacific Palisades, CA (US); Behnam Analui, Irvine, CA (US)

(73) Assignee: Qorvo US, Inc., Greensboro, NC (US)

(*) Notice: Subject to any disclaimer, the term of this patent is extended or adjusted under 35 U.S.C. 154(b) by 0 days.

(21) Appl. No.: 15/220,181

(22) Filed: Jul. 26, 2016

(65) Prior Publication Data
US 2017/0070405 A1 Mar. 9, 2017

Related U.S. Application Data

(60) Provisional application No. 62/215,450, filed on Sep. 8, 2015.

(51) Int. Cl.
*H04W 4/00* (2018.01)
*H04L 25/03* (2006.01)
*H04B 1/00* (2006.01)

(52) U.S. Cl.
CPC ..... *H04L 25/03949* (2013.01); *H04B 1/0057* (2013.01)

(58) Field of Classification Search
CPC ... H04L 25/03949; H04L 5/14; H04B 1/0057; H04B 1/00; H04B 1/50
See application file for complete search history.

(56) References Cited

U.S. PATENT DOCUMENTS

| | | |
|---|---|---|
| 2,561,212 A | 7/1951 | Lewis |
| 3,025,463 A | 3/1962 | Luoma et al. |
| 3,453,638 A | 7/1969 | Hoovler |
| 3,704,409 A | 11/1972 | Oomen |
| 3,800,218 A | 3/1974 | Shekel |
| 4,029,902 A | 6/1977 | Bell et al. |
| 4,146,851 A | 3/1979 | Dempsey et al. |
| 4,427,936 A | 1/1984 | Riblet et al. |
| 4,464,675 A | 8/1984 | Balaban et al. |
| 4,489,271 A | 12/1984 | Riblet |
| 4,694,266 A | 9/1987 | Wright |
| 4,721,901 A | 1/1988 | Ashley |
| 4,963,945 A | 10/1990 | Cooper et al. |

(Continued)

FOREIGN PATENT DOCUMENTS

| | | |
|---|---|---|
| DE | 102012107877 A1 | 2/2014 |
| EP | 1091497 A1 | 4/2001 |

(Continued)

OTHER PUBLICATIONS

EESR for European Appl. No. 13876497.2, dated Jul. 4, 2016.

(Continued)

*Primary Examiner* — Abdelnabi O Musa
(74) *Attorney, Agent, or Firm* — Withrow & Terranova, P.L.L.C.

(57) ABSTRACT

A radio frequency (RF) multiplexer with isolation enhancement includes, for example, circuit networks that may be added to a set of RF filters to enhance the isolation among the ports. In one embodiment, the enhancement network may include RF filters and equalization networks. The RF multiplexer with isolation enhancement may be passive, tunable, or reconfigurable.

20 Claims, 25 Drawing Sheets

(56) References Cited

U.S. PATENT DOCUMENTS

| | | |
|---|---|---|
| 4,964,945 A | 10/1990 | Cooper et al. |
| 4,968,967 A | 11/1990 | Stove |
| 5,408,690 A | 4/1995 | Ishikawa et al. |
| 5,483,248 A | 1/1996 | Milroy |
| 5,493,246 A | 2/1996 | Anderson |
| 5,525,945 A | 6/1996 | Chiappetta et al. |
| 5,574,400 A | 11/1996 | Fukuchi |
| 5,691,978 A | 11/1997 | Kenworthy |
| 5,781,084 A | 7/1998 | Rhodes |
| 6,178,310 B1 | 1/2001 | Jeong |
| 6,194,980 B1 | 2/2001 | Thon |
| 6,229,992 B1 | 5/2001 | McGeehan et al. |
| 6,262,637 B1 | 7/2001 | Bradley et al. |
| 6,297,711 B1 | 10/2001 | Seward et al. |
| 6,496,061 B1 | 12/2002 | Bloom |
| 6,721,544 B1* | 4/2004 | Franca-Neto ............ H04B 1/52 |
| | | 333/172 |
| 6,819,302 B2 | 11/2004 | Volman |
| 6,946,847 B2 | 9/2005 | Nishimori et al. |
| 7,072,614 B1 | 7/2006 | Kasperkovitz |
| 7,116,966 B2 | 10/2006 | Hattori et al. |
| 7,123,883 B2 | 10/2006 | Mages |
| 7,250,830 B2 | 7/2007 | Layne et al. |
| 7,283,793 B1 | 10/2007 | McKay |
| 7,330,500 B2 | 2/2008 | Kouki |
| 7,369,811 B2 | 5/2008 | Bellatoni et al. |
| 7,623,005 B2 | 11/2009 | Johansson et al. |
| 7,633,435 B2 | 12/2009 | Meharry et al. |
| 7,636,388 B2 | 12/2009 | Wang et al. |
| 7,711,329 B2 | 5/2010 | Aparin et al. |
| 7,804,383 B2 | 9/2010 | Volatier et al. |
| 7,894,779 B2 | 2/2011 | Meiyappan et al. |
| 8,013,690 B2 | 9/2011 | Miyashiro |
| 8,135,348 B2 | 3/2012 | Aparin |
| 8,149,742 B1 | 4/2012 | Sorsby |
| 8,199,681 B2 | 6/2012 | Zinser et al. |
| 8,385,871 B2 | 2/2013 | Wyville |
| 8,422,412 B2 | 4/2013 | Hahn |
| 8,514,035 B2 | 8/2013 | Mikhemar et al. |
| 8,600,329 B1 | 12/2013 | Comeau et al. |
| 8,620,246 B2 | 12/2013 | McKinzie et al. |
| 8,749,321 B2 | 6/2014 | Kim et al. |
| 8,761,026 B1 | 6/2014 | Berry et al. |
| 8,942,657 B2 | 1/2015 | McKinzie, III et al. |
| 8,957,742 B2 | 2/2015 | Spears et al. |
| 9,048,805 B2 | 6/2015 | Granger et al. |
| 9,214,718 B2 | 12/2015 | Mow et al. |
| 9,379,920 B1* | 6/2016 | Liao .................. H04L 27/01 |
| 9,450,553 B2 | 9/2016 | Langer et al. |
| 9,479,214 B2 | 10/2016 | Webb et al. |
| 9,490,866 B2 | 11/2016 | Goel et al. |
| 9,500,727 B2 | 11/2016 | Sohn et al. |
| 9,543,630 B2 | 1/2017 | Tokumitsu et al. |
| 9,590,794 B2 | 3/2017 | Behnam et al. |
| 2002/0089396 A1 | 7/2002 | Noguchi et al. |
| 2003/0109077 A1 | 6/2003 | Kim et al. |
| 2004/0000425 A1 | 1/2004 | White et al. |
| 2004/0127178 A1 | 7/2004 | Kuffner |
| 2004/0152426 A1* | 8/2004 | Suzuki ................ H04B 1/0475 |
| | | 455/83 |
| 2004/0180633 A1 | 9/2004 | Nakatani et al. |
| 2005/0070232 A1 | 3/2005 | Mages |
| 2005/0245213 A1 | 11/2005 | Hirano et al. |
| 2005/0289632 A1 | 12/2005 | Brooks |
| 2006/0019611 A1 | 1/2006 | Mages |
| 2007/0105509 A1 | 5/2007 | Muhammad |
| 2008/0128901 A1 | 6/2008 | Zurcher et al. |
| 2008/0227409 A1 | 9/2008 | Chang et al. |
| 2008/0240000 A1 | 10/2008 | Kidd |
| 2008/0261519 A1 | 10/2008 | Demarco et al. |
| 2009/0054008 A1 | 2/2009 | Satou |
| 2009/0121797 A1 | 5/2009 | Karabatsos |
| 2009/0125253 A1 | 5/2009 | Blair et al. |
| 2009/0252252 A1 | 10/2009 | Kim et al. |
| 2009/0253385 A1 | 10/2009 | Dent et al. |
| 2009/0289744 A1 | 11/2009 | Miyashiro |
| 2010/0002620 A1 | 1/2010 | Proctor et al. |
| 2010/0084146 A1 | 4/2010 | Roberts |
| 2010/0109771 A1 | 5/2010 | Baik et al. |
| 2010/0127795 A1 | 5/2010 | Bauer et al. |
| 2010/0134700 A1 | 6/2010 | Robert et al. |
| 2010/0148886 A1 | 6/2010 | Inoue et al. |
| 2010/0177917 A1 | 7/2010 | Van Der Werf |
| 2010/0323654 A1 | 12/2010 | Judson et al. |
| 2011/0069644 A1 | 3/2011 | Kim et al. |
| 2011/0080229 A1 | 4/2011 | Kennington |
| 2011/0080856 A1 | 4/2011 | Kenington |
| 2011/0134810 A1 | 6/2011 | Yamamoto et al. |
| 2011/0140803 A1 | 6/2011 | Kim et al. |
| 2011/0227664 A1 | 9/2011 | Wyville |
| 2011/0256857 A1 | 10/2011 | Chen et al. |
| 2012/0007605 A1 | 1/2012 | Benedikt |
| 2012/0063496 A1 | 3/2012 | Giannini et al. |
| 2012/0075069 A1 | 3/2012 | Dickey et al. |
| 2012/0140860 A1 | 6/2012 | Rimini et al. |
| 2012/0154071 A1 | 6/2012 | Bradley et al. |
| 2012/0161784 A1 | 6/2012 | Benedikt |
| 2012/0163245 A1 | 6/2012 | Tone et al. |
| 2012/0194269 A1 | 8/2012 | Schlager |
| 2012/0201153 A1 | 8/2012 | Bharadia et al. |
| 2012/0201173 A1 | 8/2012 | Jain et al. |
| 2012/0212304 A1 | 8/2012 | Zhang et al. |
| 2012/0230227 A1 | 9/2012 | Weiss |
| 2013/0016634 A1 | 1/2013 | Smiley |
| 2013/0063299 A1 | 3/2013 | Proudkii |
| 2013/0065542 A1 | 3/2013 | Proudkii |
| 2013/0079641 A1 | 3/2013 | Zwirn |
| 2013/0083703 A1 | 4/2013 | Granger-Jones et al. |
| 2013/0109330 A1 | 5/2013 | Sahota et al. |
| 2013/0113576 A1 | 5/2013 | Inoue et al. |
| 2013/0130619 A1 | 5/2013 | Harverson et al. |
| 2013/0154887 A1 | 6/2013 | Hein et al. |
| 2013/0201880 A1 | 8/2013 | Bauder et al. |
| 2013/0201881 A1 | 8/2013 | Bauder et al. |
| 2013/0201882 A1 | 8/2013 | Bauder et al. |
| 2013/0222059 A1 | 8/2013 | Kilambi et al. |
| 2013/0241655 A1 | 9/2013 | Liss et al. |
| 2013/0241669 A1 | 9/2013 | Mikhemar et al. |
| 2013/0242809 A1 | 9/2013 | Tone et al. |
| 2013/0245976 A1 | 9/2013 | Hind |
| 2013/0301488 A1 | 11/2013 | Hong et al. |
| 2013/0321097 A1 | 12/2013 | Khlat et al. |
| 2014/0103946 A1 | 4/2014 | Vanden Bossche |
| 2014/0169236 A1 | 6/2014 | Choi et al. |
| 2014/0194073 A1 | 7/2014 | Wyville et al. |
| 2014/0204808 A1 | 7/2014 | Choi et al. |
| 2014/0348018 A1 | 11/2014 | Bharadia et al. |
| 2014/0376419 A1 | 12/2014 | Goel et al. |
| 2015/0049841 A1 | 2/2015 | Laporte et al. |
| 2015/0118978 A1 | 4/2015 | Khlat |
| 2015/0163044 A1 | 6/2015 | Analui et al. |
| 2015/0236390 A1 | 8/2015 | Analui et al. |
| 2015/0236395 A1 | 8/2015 | Analui et al. |
| 2015/0236842 A1 | 8/2015 | Goel et al. |
| 2015/0295559 A1* | 10/2015 | White .................... H03H 9/706 |
| | | 455/78 |
| 2015/0295697 A1* | 10/2015 | Kawachi ................ H03H 9/706 |
| | | 370/276 |
| 2016/0050031 A1 | 2/2016 | Hwang et al. |
| 2016/0134325 A1 | 5/2016 | Tageman et al. |
| 2016/0204821 A1 | 7/2016 | Han et al. |
| 2016/0211870 A1 | 7/2016 | Wu et al. |
| 2016/0380608 A1* | 12/2016 | Ni ........................ H04B 1/0057 |
| | | 333/133 |
| 2016/0380706 A1 | 12/2016 | Tanzi et al. |
| 2017/0026061 A1* | 1/2017 | Wloczysiak ......... H04B 1/0057 |
| 2017/0030339 A1 | 2/2017 | Proudfoot |
| 2017/0063412 A1* | 3/2017 | Ripley ................. H04B 1/1036 |
| 2017/0070368 A1 | 3/2017 | Mandegaran |

FOREIGN PATENT DOCUMENTS

| | | |
|---|---|---|
| EP | 2733855 A1 | 5/2014 |
| EP | 2814172 A1 | 12/2014 |

(56) References Cited

FOREIGN PATENT DOCUMENTS

| | | |
|---|---|---|
| EP | 2960981 A1 | 12/2015 |
| KR | 10-2010-0134324 A | 12/2010 |
| WO | 9515018 A1 | 6/1995 |
| WO | 2014032883 A1 | 3/2014 |
| WO | 2014133625 A2 | 9/2014 |
| WO | 2015089091 A1 | 6/2015 |
| WO | 2016063108 A1 | 4/2016 |

OTHER PUBLICATIONS

Office Action for U.S. Appl. No. 14/626,572, dated Jul. 15, 2016.
Office Action for U.S. Appl. No. 14/622,627, dated May 20, 2016.
Office Action for U.S. Appl. No. 14/626,572, dated Mar. 31, 2016.
ISR for Application No. PCT/US2016/050466, dated Nov. 29, 2016.
Office Action for U.S. Appl. No. 14/626,572, dated Jul. 29, 2015.
ISR and Written Opinion for PCT Application No. PCT/US2015/016642, dated Jun. 25, 2015.
Hunter et al., "Passive Microwave Receive Filter Networks Using Low-Q Resonators," IEEE Microwave Magazine, pp. 46-53, (2005).
Laforge et al., "Diplexer design implementing highly miniaturized multilayer superconducting hybrids and filters," IEEE Transactions on Applied Superonductivity, pp. 47-54, (2009).
Marcatili et al., "Band-Splitting Filter," Bell System Technical Journal, pp. 197-212, (1961).
Matthaei et al., "Microwave Filters, Impedance-Matching Networks, and Coupling Structures," Chapter 14: Directional, Channel-Separation Filters and Traveling-WAve Ring-Resonators, pp. 843-887, Copyright 1980 Artech House, Inc., Dedham, MA; reprint of edition published by McGraw-Hill Book Company, 1964.
Matthaei et al., "Microwave Filters, Impedance-Matching Networks, and Coupling Structures," Chapter 16: Multiplexer Design, pp. 965-1000, Copyright 1980 Artech House, Inc., Dedham, MA; reprint of edition published by McGraw-Hill Book Company, 1964.
Phudpong et al., "Nonlinear Matched Reflection Mode and stop Filters for Frequency Selective Limiting Applications," Microwave Symposium Conference, IEEE/MTT-S International, pp. 1043-1046, (2007).
ISR and Written Opinion for PCT/US2014/069372, dated Mar. 3, 2015.
ISR and Written Opinion for PCT/US2015/016145, dated May 20, 2015.
ISR and Written Opinion for PCT/US2015/015930, dated May 27, 2015.
Korean International Searching Authority, ISR and Written Opinion for PCT/US2013/074155, dated Sep. 23, 2014.
Kannangara et al., "Analysis of an Adaptive Wideband Duplexer With Double-Loop Cancellation," IEEE Transactions on Vehicular Technology, vol. 56, No. 4, pp. 1761-1982, (2007).
Notice of Allowance for U.S. Appl. No. 14/102,244, dated Jul. 20, 2016.
Office Action for U.S. Appl. No. 14/102,244, dated Sep. 22, 2015.
Office Action for U.S. Appl. No. 14/102,244, dated Jun. 15, 2015.
ISR and Written Opinion for PCT/2016/054646, dated Dec. 29, 2016.

\* cited by examiner

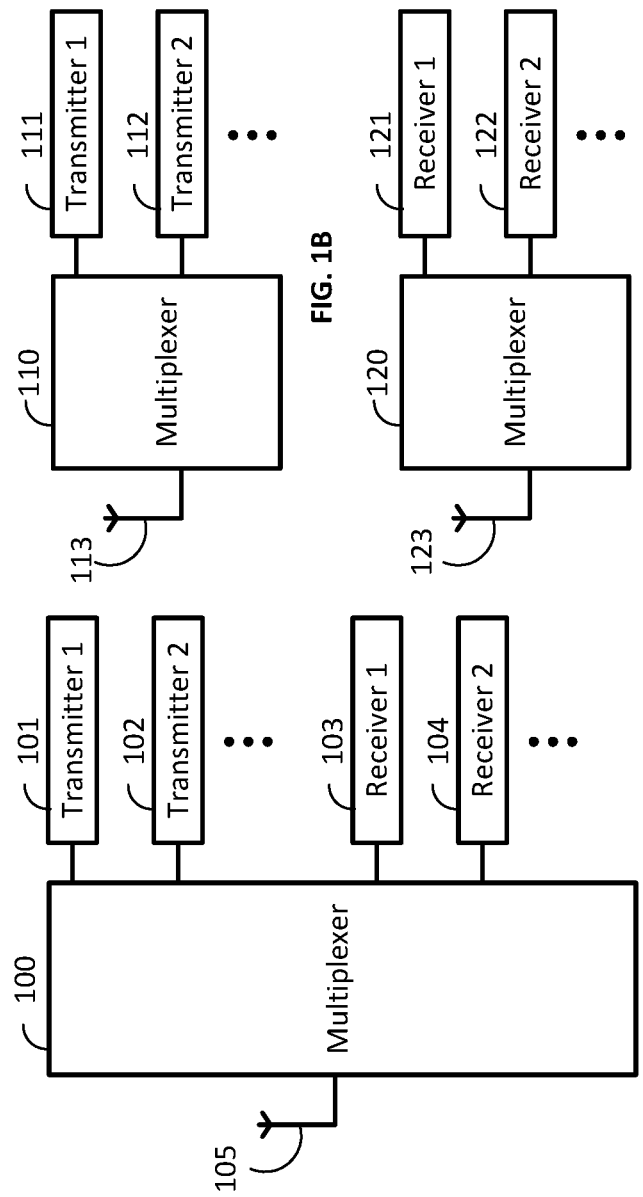

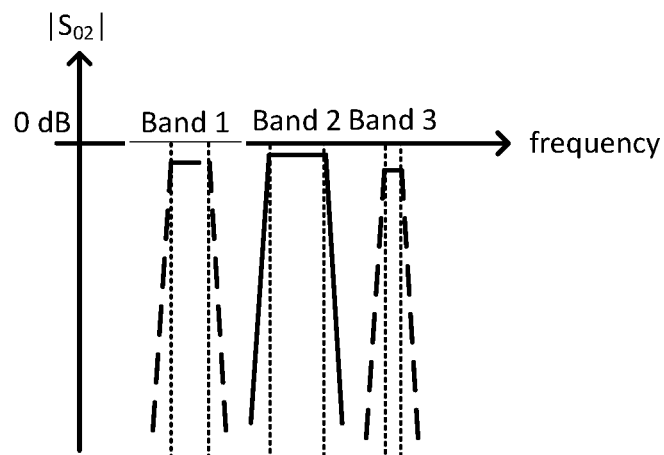
FIG. 3D
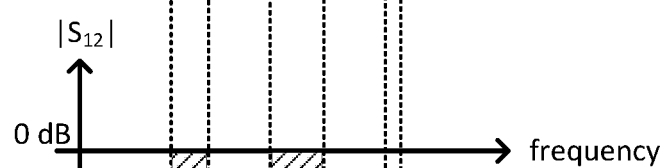
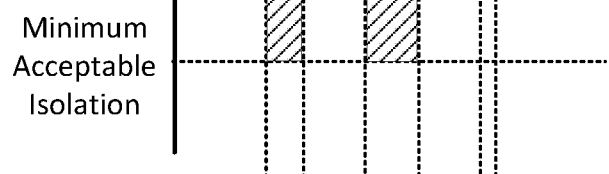
FIG. 3E
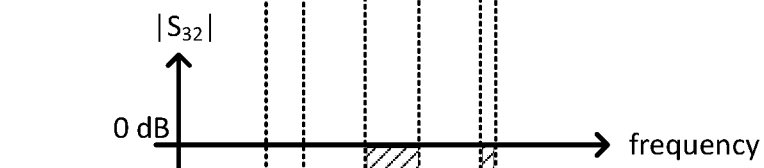
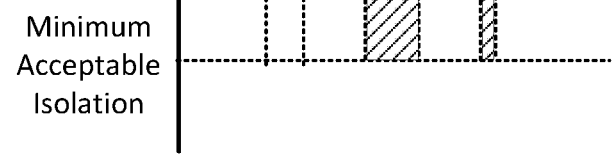
FIG. 3F

ENHANCING ISOLATION IN RADIO FREQUENCY MULTIPLEXERS

CROSS-REFERENCE TO RELATED APPLICATIONS/INCORPORATION BY REFERENCE

This patent application makes reference to, claims priority to, and claims benefit from U.S. Provisional Application No. 62/215,450, filed on Sep. 8, 2015.

The above-referenced application is hereby incorporated herein by reference in its entirety.

FIELD OF THE DISCLOSURE

Certain embodiments of the disclosure relate to radio frequency (RF) multiplexers that may be used in multi-band communication receivers, transmitters, or transceivers, for example. More specifically, certain embodiments of the disclosure relate to a method and system for enhancing isolation in RF multiplexers.

BACKGROUND OF THE DISCLOSURE

RF multiplexers are multi-port networks and are components of communication systems that support multiple frequency bands or simultaneous transmit and receive functions in a Frequency Division Duplex (FDD) scheme. High selectivity, low insertion loss, high isolation between ports, compact size, ability to handle large signals (power handling), high linearity, manufacturability, and low cost may be some of the desired features for RF multiplexers.

The RF duplexer, a three-port network, is the most common form of RF multiplexer, where the ports are nominally connected to an antenna, a transmitter, and a receiver of an FDD communication system.

The increase of number of frequency bands that are allocated to wireless communication systems, such as those used in cellular phones, has resulted in using several RF filters, switches, and duplexers in the same device. For instance, RF switches can select the appropriate RF filters and duplexers that correspond to the desired RF frequency bands.

Some wireless communication standards require simultaneous operation of the receiver or transmitter at multiple frequency bands to achieve higher capacity, diversity, or data rate. For instance, the fourth generation wireless standards, commonly referred to as 4G, envision Carrier Aggregation (CA) to increase the total bandwidth to the user. In such cases, RF multiplexers can be used.

An RF multiplexer, in its simplest form, is a 1×N network that includes 1 nominal input and N nominal output ports, where N is a positive integer. Ideally, the transfer functions from the input to each of the N output ports are non-overlapping in frequency while the N output ports are isolated at their respective frequency bands. In other words, the transfer functions from each of the output ports to every other output port should have a small magnitude at the frequency bands corresponding to those two ports.

Conventional 1×N RF multiplexers include RF Band-Pass Filters (BPF) with distinct passband frequencies that are connected to a common port using a passive network or a number of passive networks. The passive network or networks can ensure proper impedance at all frequency bands of interest and may assist in enhancing the frequency response.

The requirements for RF filters and multiplexers have become more stringent in light of new communication standards where information channels and frequency bands are closer to each other, new communication devices such as smartphones where the footprint and cost of all components must be very small as more components are needed in support of multiple standards and applications, and co-existent communication systems where multiple communication transmitters and receivers work simultaneously.

Linearity, noise, and power handling requirements might lead to utilization of passive RF filters and multiplexers in many applications. The performance of passive RF filters and multiplexers may be limited by the quality factor (Q) of the components that are used in their realization. The filter selectivity as well as passband requirement may lead to a filter topology and filter order. For a given RF filter or duplexer topology and order, insertion loss may reduce with the increase of component Q.

Various technologies can be used to realize passive RF filters and multiplexers. For instance, capacitors, inductors, or transmission lines can be used to realize passive RF filters and duplexers. Electromagnetic resonators, including waveguide resonators and dielectric resonators, can also be used to realize passive filters and duplexers. The quality factor of such components is proportional to their overall physical size. As such, it has been difficult to realize compact low-loss selective passive RF filters and duplexers using electromagnetic components and resonators.

Piezoelectric material can be used to realize compact high-Q resonators. Surface acoustic wave (SAW) resonators have been widely used to realize compact low-loss selective RF filters and duplexers as well as oscillators. More recently, bulk acoustic wave (BAW) resonators have been used to construct high-performance RF filters and duplexers as well as oscillators. Ceramic resonators and micro electro mechanical system (MEMS) resonators with high quality factor have also been used in frequency generation as well as filtering applications.

RF SAW filters and duplexers have been used widely in wireless communications such as cellular phones, wireless local area network (WLAN) transceivers, global positioning system (GPS) receivers, cordless phones, and so forth. RF SAW filters have been used as band-select filters, image-reject filters, intermediate frequency (IF) filters, transmitter noise or spur reduction filters, and so forth. A smartphone may have several SAW resonators, SAW filters, and SAW duplexers to support various communication systems and standards.

Significant research and development on BAW technology has resulted in BAW resonators that have lower loss (or higher Q) or are more compact, especially at higher frequencies, compared with SAW resonators. Therefore, RF filters and duplexers that use BAW resonators may have lower insertion loss, or higher selectivity, or smaller form factor compared with those that utilize SAW resonators especially at higher frequencies. Thin film bulk acoustic resonators (FBAR) and solidly mounted resonator (SMR) are common examples of BAW resonators.

Modern wireless communication standards designate many different operational frequency bands to support the increase in the overall wireless capacity and reach. For instance, current cellular phone standards may include RF frequency bands that span around 700 MHz to around 4000 MHz. Furthermore, in order to increase the overall wireless capacity, the frequency spacing between adjacent frequency bands or channels within the same application or different applications may be reduced. This may be done, for instance, by reducing the guard bands in wireless standard or by placing the transmit and receive frequency bands in an FDD scheme closer to each other. As a result, RF filters and duplexers with higher selectivity may be required. More selective RF filters and duplexers that utilize a given component or technology (SAW, BAW, etc.) may incur more in-band insertion loss. The higher RF filter or duplexer insertion loss may reduce the wireless receiver noise figure and sensitivity, increase the wireless transmitter power consumption or reduce the transmitted power, and/or deteriorate the overall performance of a communication system.

In commercial systems, the choice of technology may depend on the technical performance, such as power consumption as well as economic and business considerations such as cost, size, and time to market. For instance, while one technology may offer a better performance compared with another technology, it may not be adopted for a commercial system that is cost sensitive. In the case of RF filters and duplexers, it may be desirable to use a technology that leads to the lowest-cost and/or most-compact solution, as long as a predetermined performance criterion is met. In other words, a more expensive or larger solution may not be adopted, even if it offers a better performance as compared with an alternative solution that meets an acceptable performance level at a lower cost and/or size. For instance, while RF filters and multiplexers that use BAW resonators may offer lower loss compared with RF filters and multiplexers that use SAW resonators for a given set of specifications, the higher relative cost of BAW technology, as well as its relatively smaller number of suppliers, may disfavor their usage in certain applications and standards. Other considerations may be the ease of integration with the rest of the components in a communication system. For instance, there may be performance, business, or economic advantages to integrate RF filters and multiplexers with low noise amplifiers (LNA), power amplifiers (PA), transmit/receive (T/R) or band-select switches, impedance matching networks, etc. A modern wireless communication device, such as a smartphone, may have a number of SAW filters and multiplexers as well as a number of BAW filter and duplexers. Each SAW or BAW filter or duplexer may be used for a specific communication application, standard, or frequency band.

A conventional method to design acoustic resonator based filters and duplexer is to decide upon the number of resonators to be used depending on the required stopband rejection in the case of filters or the required isolation in the case of duplexers. The larger the number of resonators used in filter design, the larger may be the order of the filter and the sharper may be the filter roll-off around passband. Sharper filter roll-off may mean higher stopband rejection. Similarly, the number of resonators used in the TX and RX filters of the duplexer may determine the total isolation from TX to RX. The larger the order of the TX and RX filters (i.e., the larger the number of resonators used in them), the larger may be the amount of isolation between TX and RX. Due to the limited quality factor of the acoustic resonators, the insertion loss in the filter and duplexer may be directly proportional to the number of the resonators used. In other words, the larger the order of the filter and the TX and RX filter, the larger may be the loss of the filter and duplexer, respectively.

What is needed are architectural solutions that enable realization of highly selective low-loss multiplexers with high isolation between the ports. Specifically, it is highly desirable to use a lower cost or more compact technology within an innovative architecture that satisfies a comparable or better specification compared to what can be achieved using a more expensive or less compact technology. Examples might include replacing BAW multiplexers with SAW multiplexers using an innovative architecture, or replacing ceramic or cavity multiplexers with BAW multiplexers using an innovative architecture.

Furthermore, what is needed are architectural solutions that enable realization of tunable, reconfigurable, or programmable RF multiplexers that can satisfy the requirement of multi-standard communication systems are highly sought after.

Further limitations and disadvantages of conventional and traditional approaches will become apparent to one of skill in the art, through comparison of such systems with the present disclosure as set forth in the remainder of the present application with reference to the drawings.

BRIEF SUMMARY OF THE DISCLOSURE

A system and/or method for enhancing isolation in RF multiplexers, substantially as shown in and/or described in connection with at least one of the figures, as set forth more completely in the claims.

An objective of this disclosure is to enable realization of RF multiplexers with high isolation between the ports. Another objective of this disclosure is to enhance the isolation of RF multiplexers by adding isolation enhancement networks.

Various advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

Represented simulation results of various embodiments are only for illustrative reasons, and are not meant to cover all possible responses that various embodiments enable. For instance, some of the presented simulation results might cover filters with a single passband and at least one stopband (or notch) in their transfer functions. Filters with multiple passbands or stopbands may also be realized using the embodiments or other teachings of this disclosure. Filters whose transfer functions fundamentally change as a function of at least one stimulus may also be realized using the embodiments or other teachings of this disclosure.

FIGS. 1A-1C illustrate various applications of an RF multiplexer in the front-end of a multi-band communication system.

FIGS. 3A-3I illustrate a representative frequency response of an RF multiplexer.

DETAILED DESCRIPTION OF THE DISCLOSURE

Figure 2B:
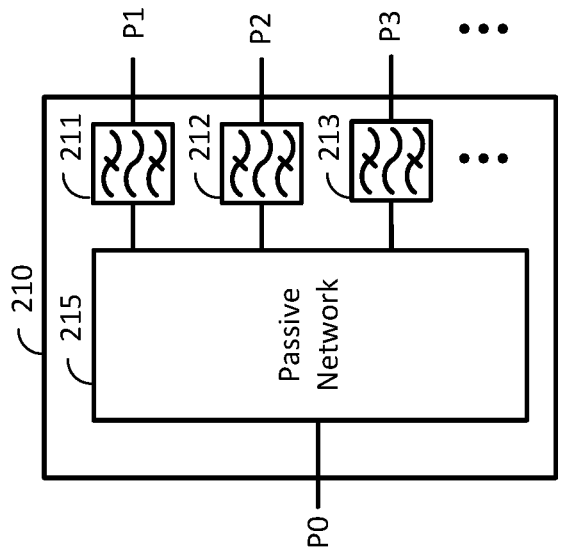
FIGS. 2A-2B illustrate two realizations of an RF multiplexer that includes individual band-pass filters and impedance matching passive network(s).

As utilized herein the terms "circuit" and "circuitry" refer to physical electronic components (i.e. hardware) and any software and/or firmware ("code") which may configure the hardware, be executed by the hardware, and/or otherwise be associated with the hardware. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations.

Illustrative embodiments are now described. Other embodiments may be used in addition or instead. Details that may be apparent to a person of ordinary skill in the art may have been omitted. Some embodiments may be practiced with additional components or steps and/or without all of the components or steps that are described.

The components, steps, features, objects, benefits and advantages which have been discussed are merely illustrative. None of them, nor the discussions relating to them, are intended to limit the scope of protection in any way. Numerous other embodiments are also contemplated. These include embodiments which have fewer, additional, and/or different components, steps, features, objects, benefits and advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are hereby incorporated herein by reference in their entirety.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

The disclosure has application in multi-band, multi-standard, and multi-function wireless communication systems. For instance, it can be configured to support carrier aggregation in a wireless communication standard. It can be configured to support frequency division duplex communication system. It can be applied to hand-portable platforms such as smartphones, tablets, cell phones, laptops, etc. that support wireless communications. The disclosure can also be applied to wireless communication base stations, including micro-, pico-, and femto-base stations, repeaters, and signal boosters.

FIG. 1A illustrates an embodiment of a frequency multiplexer 100 that enables connecting a number of transmitters 101, 102, . . . and receivers 103, 104, . . . to one or more common antennas such as a common antenna 105. It is noted that the transmitters 101, 102, . . . and receivers 103, 104, . . . need not be separate and may be realized as a single multi-band, multi-standard, or multi-function transceiver.

FIG. 1B illustrates an embodiment of a frequency multiplexer 110 that enables connecting a number of transmitters 111, 112, . . . to one or more common antennas such as a common antenna 113. It is noted that the transmitters 111, 112, . . . need not be separate and may be realized as a single multi-band, multi-standard, or multi-function transmitter.

FIG. 1C illustrates an embodiment of a frequency multiplexer 120 that enables connecting a number of receivers 121, 122, . . . to one or more common antennas such as a common antenna 123. It is noted that the receivers 121, 122, . . . need not be separate and may be realized as a single multi-band, multi-standard, or multi-function receiver.

Figure 2A:
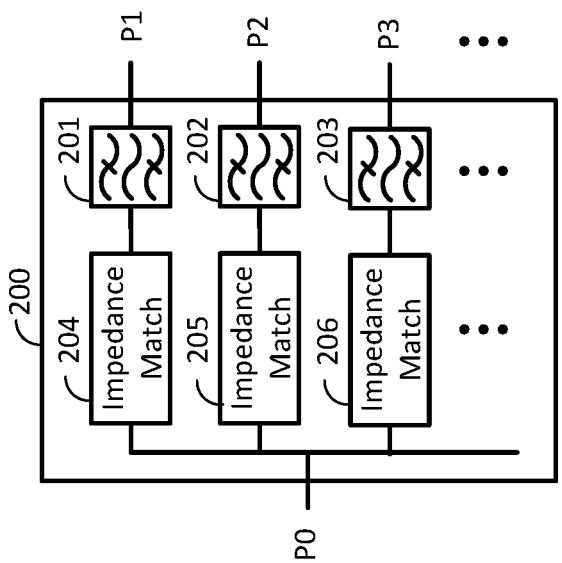

FIG. 2A illustrates a realization of a frequency multiplexer 200 that enables connecting ports P1, P2, P3, . . . to a common port P0. The signal path from each port to the common port P0 includes a band-selective filter and an impedance matching network. For instance, the signal path from port P1 to the common port P0 includes a band-pass filter 201 and an impedance matching network 204. Likewise, the signal path from port P2 to the common port P0 includes a band-pass filter 202 and an impedance matching network 205, and the signal path from port P3 to the common port P0 includes a band-pass filter 204 and an impedance matching network 206. In an example wireless communication system, common port P0 is coupled to an antenna, while ports P1, P2, P3, . . . correspond to transmitter or receiver ports.

FIG. 2B illustrates a realization of a frequency multiplexer 210 that enables connecting ports P1, P2, P3, . . . to a common port P0. The signal path from each port to the common port P0 includes a band-selective filter 211, 212, 213, . . . and a common passive network 215. The common passive network 215 might be used for impedance matching, enhancing the isolation between various ports or signal paths, providing additional filtering, or other purposes. In an example wireless communication system, common port P0 is coupled to an antenna, while ports P1, P2, P3, . . . correspond to transmitter or receiver ports.

In some realizations, the multiplexer may be constructed by a proper combination of duplexers, filters, passive components, etc. The isolation enhancement methods covered in this disclosure are applicable to such multiplexers as well.

FIGS. 3A-3I illustrate frequency-domain response of a multiplexer. In this example, the frequency multiplexer is designed to multiplex three different frequency bands designated as Band 1, Band 2, and Band 3, each with a different frequency band and bandwidth.

Figure 3A:
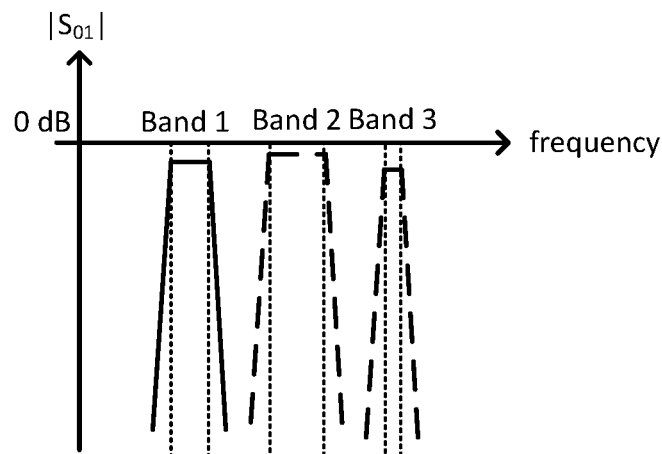

FIG. 3A illustrates the magnitude transfer function between port 1 (P1) and common port 0 (P0) as $|S_{01}|$ in solid line. In this case, the transfer function is a band-pass response selecting Band 1. Given that typical frequency multiplexers are passive, the magnitude of the power transfer function between any two ports cannot exceed unity which corresponds to zero in the common decibel units.

FIG. 3D illustrates the magnitude transfer function between port 2 (P2) and common port 0 (P0) as $|S_{02}|$ in solid line. In this case, the transfer function is a band-pass response selecting Band 2. Given that typical frequency multiplexers are passive, the magnitude of the power transfer function between any two ports cannot exceed unity which corresponds to zero in the common decibel units.

Figure 3B:
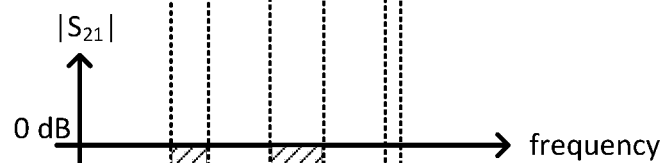
Figure 3C:
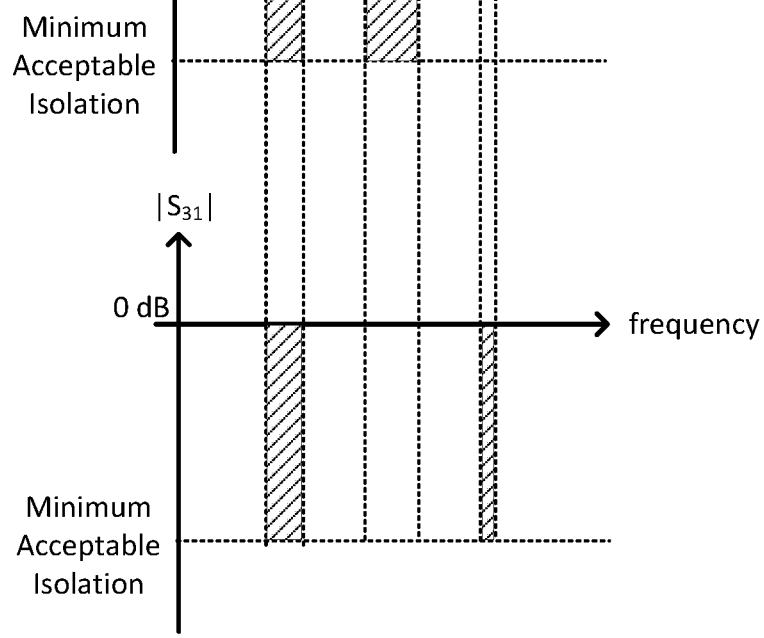
Figure 3G:
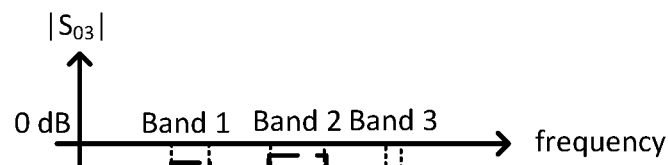

FIG. 3G illustrates the magnitude transfer function between port 3 (P3) and common port 0 (P0) as $|S_{03}|$ in solid line. In this case, the transfer function is a band-pass response selecting Band 3. Given that typical frequency multiplexers are passive, the magnitude of the power transfer function between any two ports cannot exceed unity which corresponds to zero in the common decibel units.

FIG. 3B illustrates the desirable regions for the magnitude transfer function between ports 1 and 2 as $|S_{21}|$ in this frequency multiplexer. In this case, it is desirable that ports 1 and 2 are isolated in both of their corresponding frequency bands Band 1 and Band 2. This is illustrated by crossing out a "forbidden region" for the transfer function $|S_{21}|$. Likewise, FIG. 3E illustrates the desirable regions for the magnitude transfer function between ports 2 and 1 as $|S_{12}|$ in this frequency multiplexer. In this case, it is desirable that ports 2 and 1 are isolated in both of their corresponding frequency bands Band 2 and Band 1. This is illustrated by crossing out a "forbidden region" for the transfer function $|S_{12}|$. In fact, in a reciprocal network, $|S_{12}|$ will be the same as $|S_{21}|$.

Figure 3H:

FIG. 3C illustrates the desirable regions for the magnitude transfer function between ports 1 and 3 as ISA in this frequency multiplexer. In this case, it is desirable that ports 1 and 3 are isolated in both of their corresponding frequency bands Band 1 and Band 3. This is illustrated by crossing out a "forbidden region" for the transfer function ISA. Likewise, FIG. 3H illustrates the desirable regions for the magnitude transfer function between ports 3 and 1 as $|S_{13}|$ in this frequency multiplexer. In this case, it is desirable that ports 3 and 1 are isolated in both of their corresponding frequency bands Band 3 and Band 1. This is illustrated by crossing out a "forbidden region" for the transfer function $|S_{13}|$. In fact, in a reciprocal network, $|S_{13}|$ will be the same as $|S_{31}|$.

Figure 3I:
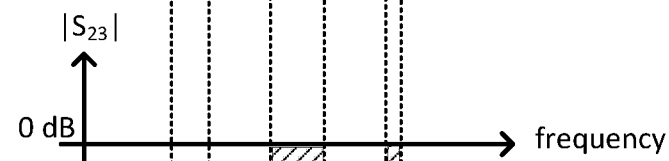

FIG. 3F illustrates the desirable regions for the magnitude transfer function between ports 2 and 3 as $|S_{32}|$ in this frequency multiplexer. In this case, it is desirable that ports 2 and 3 are isolated in both of their corresponding frequency bands Band 2 and Band 3. This is illustrated by crossing out a "forbidden region" for the transfer function $|S_{32}|$. Likewise, FIG. 3I illustrates the desirable regions for the magnitude transfer function between ports 3 and 2 as $|S_{23}|$ in this frequency multiplexer. In this case, it is desirable that ports 3 and 12 are isolated in both of their corresponding frequency bands Band 3 and Band 2. This is illustrated by crossing out a "forbidden region" for the transfer function $|S_{23}|$. In fact, in a reciprocal network, $|S_{23}|$ will be the same as $|S_{32}|$.

Figure 4:
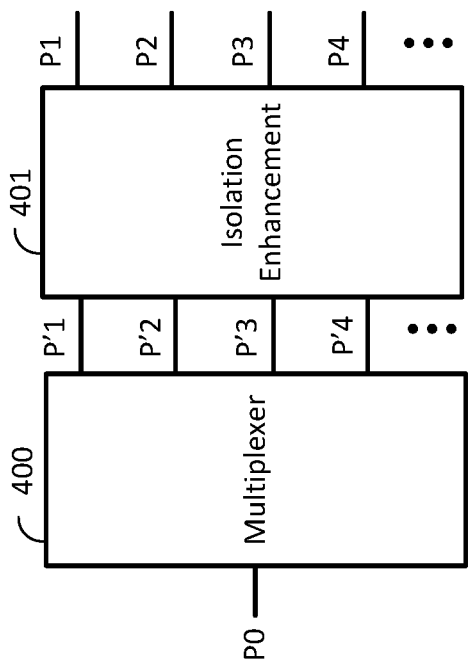
FIG. 4 illustrates an embodiment of an RF multiplexer with an added isolation enhancement network.

FIG. 4 shows an embodiment of the present disclosure where an isolation enhancement network 401 is connected to a multiplexer 400 so that the mutual isolation between ports P1, P2, P3, P4, . . . is enhanced compared with the inherent isolation of the multiplexer ports P'1, P'2, P'3, P'4, . . . .

Figure 5:
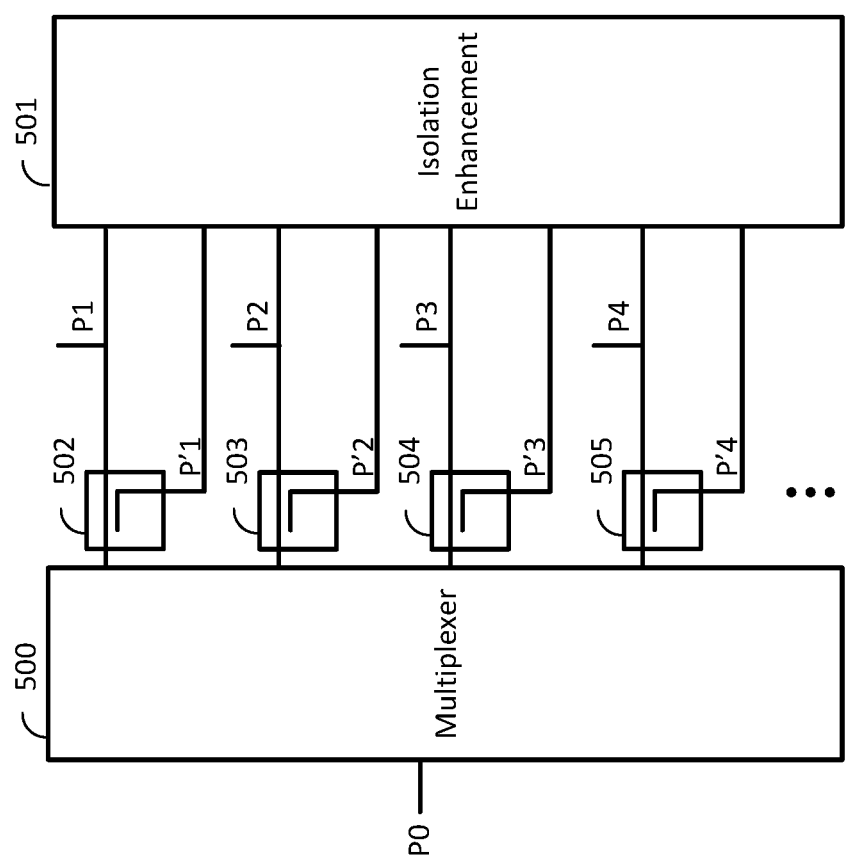
FIG. 5 illustrates an embodiment of an RF multiplexer with an added isolation enhancement network that uses passive coupling networks to sample the signals present at individual ports (sampled ports).

FIG. 5 shows an embodiment of the present disclosure where an isolation enhancement network 501 is connected to a multiplexer 500 so that the mutual isolation between ports P1, P2, P3, P4, . . . is enhanced compared with the inherent isolation of the multiplexer ports P'1, P'2, P'3, P'4, . . . Isolation enhancement network 501 interfaces with the multiplexer 500 through multiplexer ports P1, P2, P3, P4, . . . as well as through coupled portions of the signals on those ports designated as P'1, P'2, P'3, P'4, . . . . In this example, coupling between ports P1, P2, P3, P4, . . . and ports P'1, P'2, P'3, P'4, . . . is done through couplers 502, 503, 504, 505, . . . . In one realization, couplers are designed to transfer most of the power to the Pi ports and less of the power to the P'i ports where i is an integer number corresponding to ports 1, 2, 3, 4, etc. For instance, 10 dB couplers may be used where 90% of the power is transferred to ports Pi and 10% of the power is transferred to ports P'i. One advantage of such realizations is lower insertion loss between the common port P0 and the multiplexed ports P1, P2, P3, P4, etc.

Figure 6:
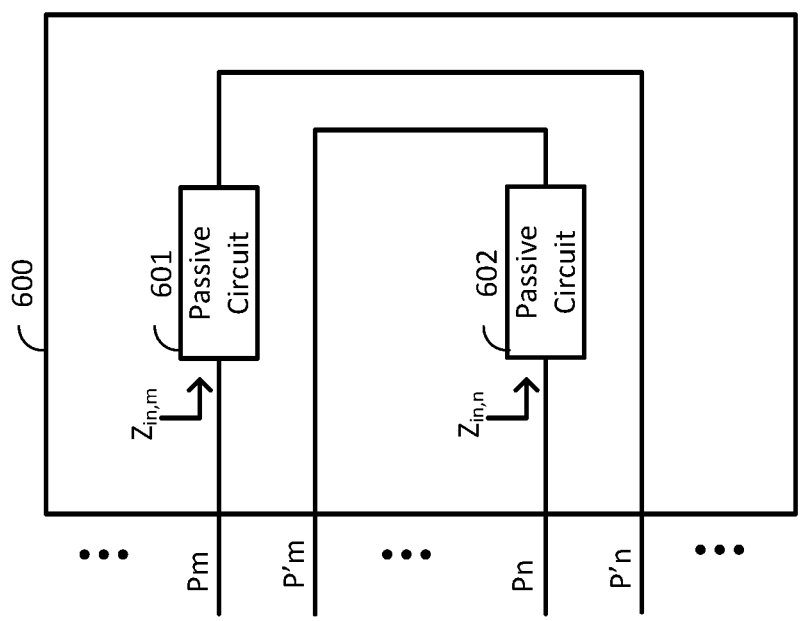
FIG. 6 illustrates an embodiment of an isolation cancellation network that includes passive networks between multiplexer ports and sampled ports.

FIG. 6 is an embodiment of an isolation enhancement network 600 that can be used in the configuration shown in FIG. 5 as block 501. Ports Pm (m=1, 2, 3, . . . ) are connected to ports P'n (n=1, 2, 3, . . . and n≠m) through a passive circuit 601 that has a high input impedance $Z_{in,m}$, $Z_{in,n}$, . . . at some frequency range of interest. Given the high impedance seen in each port Pm (m=1, 2, 3, . . . ), especially in comparison with the impedance of other blocks connected to these ports, little power is delivered to the isolation enhancement network 600 through these ports at some frequency range of interest. The same impedance in each port Pm (m=1, 2, 3, . . . ) may be low at some other frequency range of interest facilitating power delivery. Passive blocks 601, 602, etc. are hence designed to provide desired driving point impedance levels at different frequency ranges. For instance, any of the passive blocks 601, 602, etc. may include a passive filter at its input so that it enables power delivery only at filter's passband frequencies.

Figure 7A:
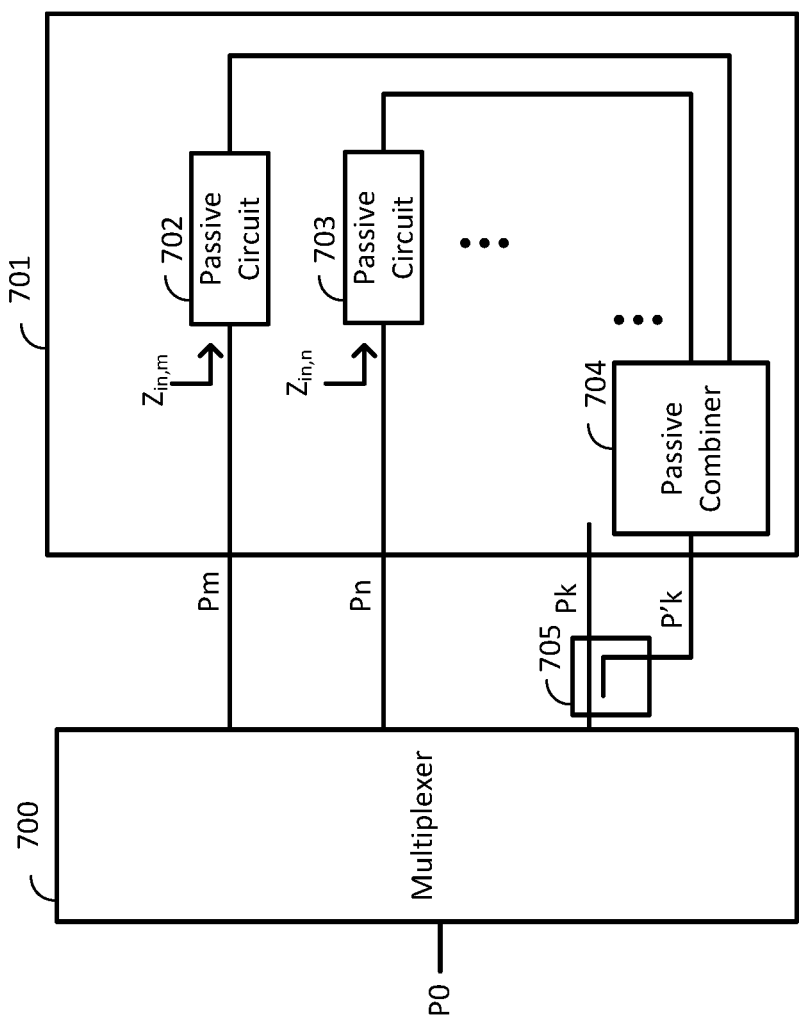
FIGS. 7A-7B illustrate two embodiments of an RF multiplexer with an added isolation enhancement network that use either a passive combiner or multiple coupling networks to couple multiple processed signals through passive networks into each sampled port.
Figure 7B:
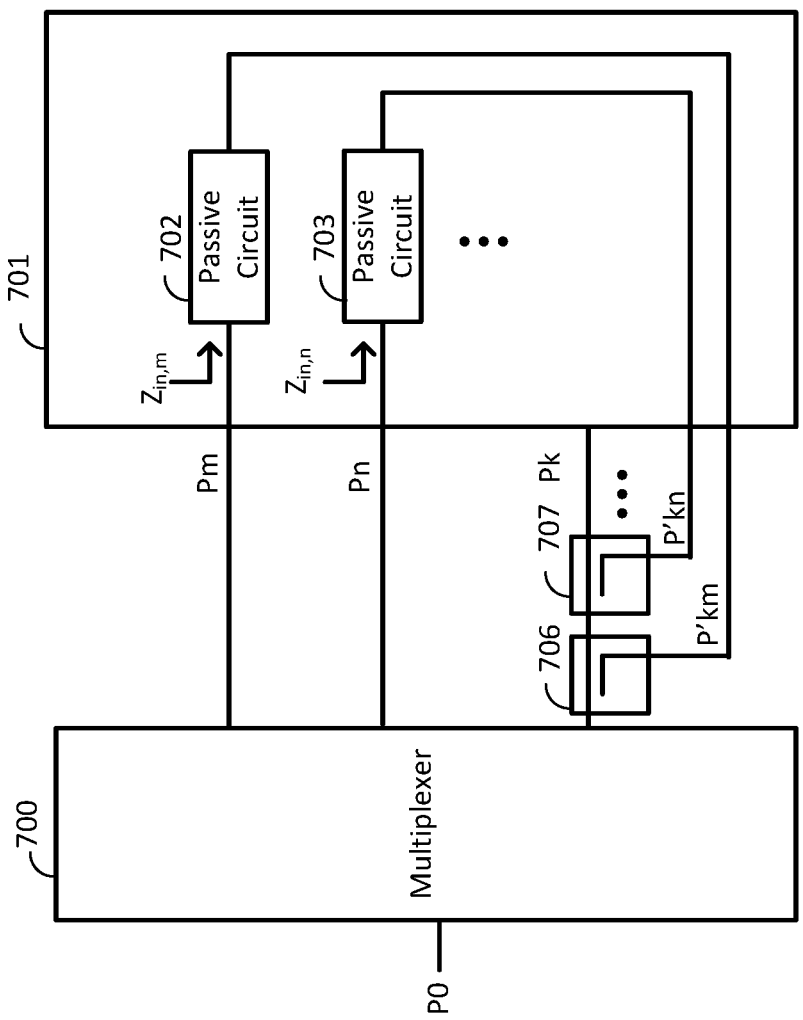

FIGS. 7A-7B show two embodiments of the present disclosure where isolation enhancement networks are coupled to multiplexers. FIG. 7A shows one embodiment of the present disclosure where isolation enhancement network 701 is coupled to the multiplexer 700 through ports Pm (m=1, 2, 3, . . . ) and P'k (k=1, 2, 3, . . . ). Signals from ports Pm (m=1, 2, 3, . . . ) are combined through a power combiner 704 and coupled to port P'k (k≠m) after passing through passive networks 702, 703, . . . each with a high input impedance at some frequency range of interest. Coupler 705 enables connection between multiplexer 700 and isolation enhancement network 701. FIG. 7B shows one embodiment of the present disclosure where isolation enhancement network 701 is coupled to the multiplexer 700 through ports Pm (m=1, 2, 3, . . . ) and P'km (k, m=1, 2, 3, . . . ). Signals from ports Pm (m=1, 2, 3, . . . ) pass through passive networks 702, 703, . . . each with a high input impedance at some frequency range of interest. Couplers 706, 707, . . . enable connection between multiplexer 700 and isolation enhancement network 701.

The operation of the isolation enhancement network 701 may be explained as in the following. Consider a non-ideal multiplexer 700 with finite unwanted leakage of signals from ports Pm, Pn, . . . to the port Pk at the frequency range of interest of port k. Passive circuits 702, 703, . . . are designed to have high input impedance at the frequencies corresponding to ports Pm, Pn, . . . . Therefore, for instance, signals at port Pm within the frequency range corresponding to port Pm will primarily enter the multiplexer 700 and do not enter the isolation enhancement network 701. However, for instance, signals at port Pm within the frequency range corresponding to port Pk will now primarily enter the isolation enhancement network 701, go to the passive network 702, and couple to port Pk. The passive network 702 is designed in such a way that such a coupled signal cancels the unwanted leakage from port Pm to port Pk (through the nonideal multiplexer 701). In other words, passive circuit 702 is designed so that its transfer function combined with that of the coupling network (e.g., passive combiner 704 and coupler 705 in FIG. 7A or coupler 706 in FIG. 7B) is the same (or very close) to the unwanted leakage transfer function between ports Pm and Pk in the non-ideal multiplier 700. The same mechanism applies to port Pn, etc.

Figure 8:
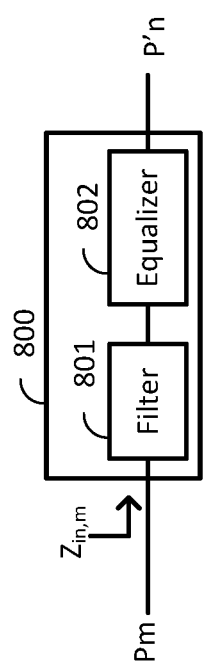
FIG. 8 shows an embodiment of a passive network used in the isolation enhancement network consisting of a filter and an equalizer.

FIG. 8 shows an embodiment of passive network 800 that can be used in the isolation enhancement network, for instance, to couple ports Pm (m=1, 2, 3, . . . ) to ports P'n (n=1, 2, 3, . . . and n≠m). The passive network 800 includes a filter 801 and an equalizer 802. Filter 801 may be designed to offer high input impedance, $Z_{in,m}$, at a frequency range of interest which can be different than the passband of the filter. In fact, if filter 801 is lossless and passive, the input impedance of the filter is reflective within the filter passband. Equalizer 802 may be designed to modify the amplitude and phase responses at a frequency range of interest which may or may not overlap with the frequency range of interest for which the filter offers high input impedance.

Figure 9:
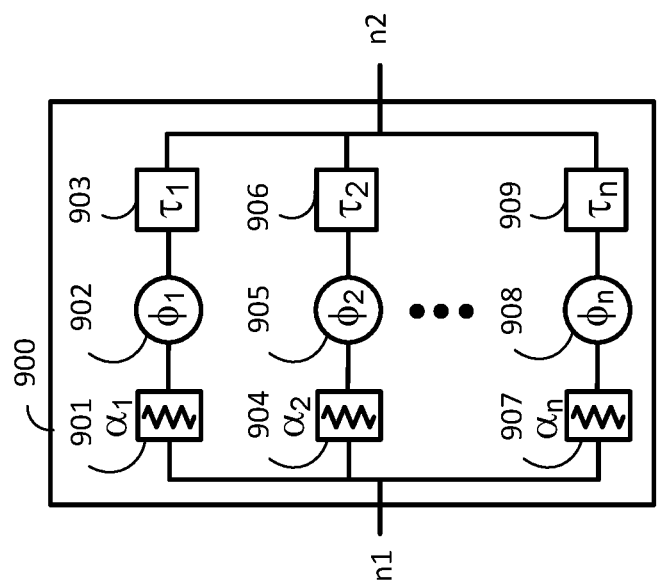
FIG. 9 shows an embodiment of a passive equalizer that includes parallel branches of attenuators, phase shifters, and delay elements.

FIG. 9 shows an embodiment of passive equalizer 900 that may include attenuators 901, 904, 907, . . . , phase shifters 902, 905, 908, . . . , and time delays 903, 906, 909, . . . . The passive equalizer includes parallel branches where each branch includes attenuator, phase shifter, and time delay. It is noted that not all paths must include all of the attenuator, phase shifter, and time delay. For instance, one branch may include attenuator and phase shifter. It is also noted that these blocks need not be implemented as separate blocks with only one function. For instance, once block may achieve two or three functions of the amplitude control (attenuator), phase shifting, and time delay, simultaneously. Furthermore, these blocks may achieve their desired function only at a range of frequencies. For instance, a block may offer time delay only at a desired range of frequencies. The number of parallel branches in the equalizer may be one or higher to offer equalization across a wider range of frequencies. In an example embodiment, a group delay associated with a narrowband circuit at a frequency band or frequency bands of interest may be used in realization of the time delay.

Figure 10:
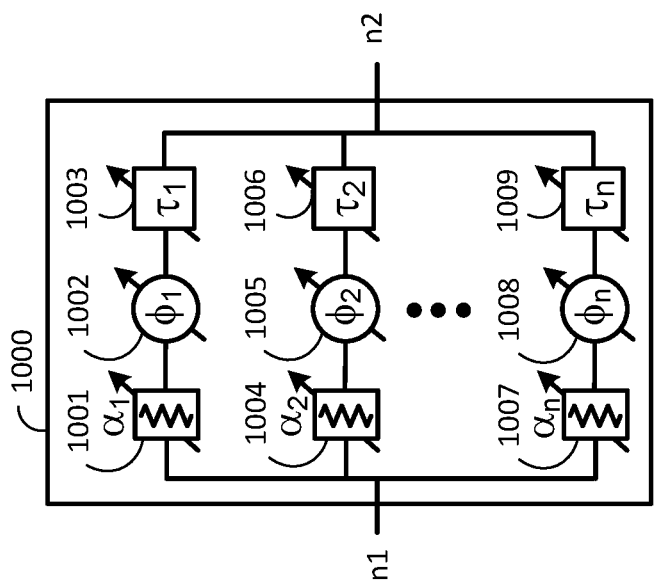
FIG. 10 shows an embodiment of a passive variable equalizer that includes parallel branches of variable attenuators, variable phase shifters, and variable delay elements.

FIG. 10 shows an embodiment of a passive equalizer 1000 that may include variable attenuators 1001, 1004, 1007, . . . , variable phase shifters 1002, 1005, 1008, . . . , and variable time delays 1003, 1006, 1009, . . . . The passive equalizer includes parallel branches where each branch includes a variable attenuator, a variable phase shifter, and a variable time delay. It is noted that not all paths must include all of the variable attenuator, the variable phase shifter, and the variable time delay. For instance, one branch may include the variable attenuator and the variable phase shifter. It is noted that not all these blocks must be variable. For instance, some of the attenuators, phase shifters, and time delays may be fixed and some may be variable. It is also noted that these blocks need not be implemented as separate blocks with only one function. For instance, one block may simultaneously achieve two or three functions of the variable amplitude control (attenuator), variable phase shifting, and variable time delay. Furthermore, these blocks may achieve their desired function only at a range of frequencies. For instance, a block may offer variable time delay only at a desired range of frequencies. The number of parallel branches in the equalizer may be set to offer equalization across a wider range of frequencies. Variable blocks might be used to modify the frequency range of interest or to accommodate for wanted or unwanted changes in other circuitry such as temperature.

Figure 11:
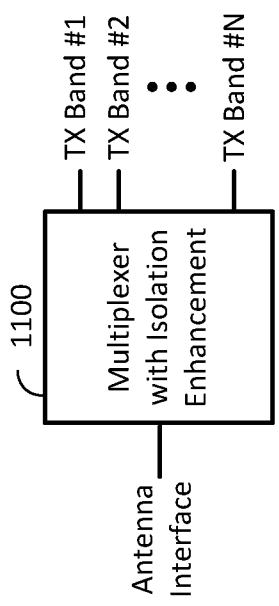
FIG. 11 shows one application of the RF multiplexer with isolation enhancement in the front-end of a multi-band communication system.

FIG. 11 shows an embodiment of a multiplexer with isolation enhancement 1100 that is used to interface multiple transmit frequency bands, TX Band #1, TX Band #2, . . . , TX Band #N (N is a positive integer) to a common antenna interface. Transmit bands may correspond to different transmitters operating at different frequency bands. Some of the transmit bands may correspond to one transmitter that works at more than one frequency band. This scheme may be used, for instance, in a multi-band wireless communication device.

Figure 12:
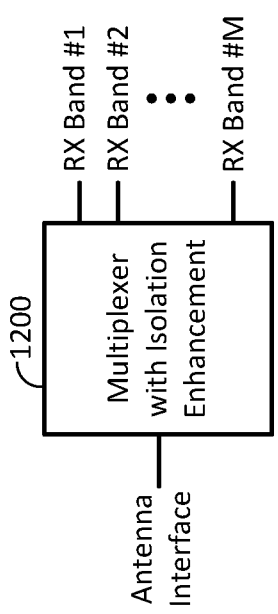
FIG. 12 shows another application of the RF multiplexer with isolation enhancement in the front-end of a multi-band communication system.

FIG. 12 shows an embodiment of a multiplexer with isolation enhancement 1200 that is used to interface multiple receive frequency bands, RX Band #1, RX Band #2, . . . , RX Band #M (M is a positive integer) to a common antenna interface. Receive bands may correspond to different receivers operating at different frequency bands. Some of the receive bands may correspond to one receiver that works at more than one frequency band. This scheme may be used, for instance, in a multi-band wireless communication device.

Figure 13:
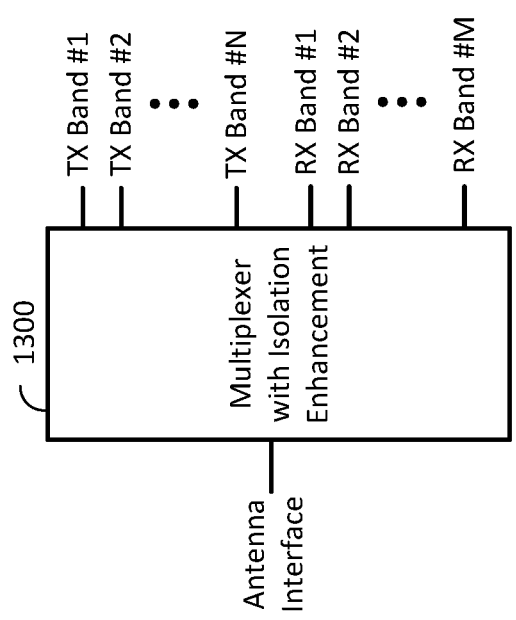
FIG. 13 shows another application of the RF multiplexer with isolation enhancement in the front-end of a multi-band communication system.

FIG. 13 shows an embodiment of a multiplexer with isolation enhancement 1300 that is used to interface multiple transmit frequency bands, TX Band #1, TX Band #2, . . . , TX Band #N, and multiple receive frequency bands RX Band #1, RX Band #2, . . . , RX Band #M to a common antenna interface. Transmit bands may correspond to different transmitters operating at different frequency bands. Some of the transmit bands may correspond to one transmitter that works at more than one frequency band. Receive bands may correspond to different receivers operating at different frequency bands. Some of the receive bands may correspond to one receiver that works at more than one frequency band. This scheme may be used, for instance, in a multi-band wireless communication device.

Figure 14:
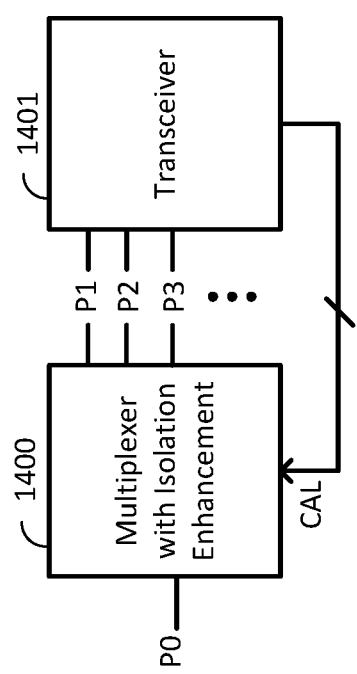
FIG. 14 shows an embodiment of a controllable multiplexer with isolation enhancement in conjunction with a communication transceiver.

FIG. 14 shows an embodiment of a multiplexer with isolation enhancement 1400 that interfaces with transceiver 1401. Port P0 of the multiplexer with isolation enhancement 1400 may correspond to an antenna interface. Ports P1, P2, P3, . . . may correspond to transmit or receive frequency bands. Transceiver may send certain information CAL to the multiplexer with isolation enhancement. This information, for instance, may correspond to locations of frequency bands or quality of information captured or processed in the transceiver. This information, for instance, may be applied to the variable blocks of the multiplexer with isolation enhancement. This scheme may be applicable to multi-band communication systems.

Figure 15:
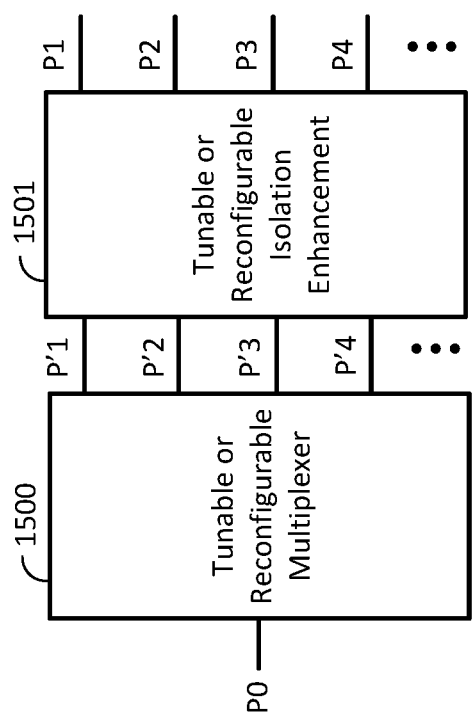
FIG. 15 illustrates an embodiment of a tunable or reconfigurable multiplexer with a tunable or reconfigurable isolation enhancement network.

FIG. 15 shows an embodiment of a tunable or reconfigurable multiplexer 1500 with tunable or reconfigurable isolation enhancement network 1501 that interface with each other through ports P'1, P'2, P'3, P'4, . . . Port P0 is the common port of the tunable or reconfigurable multiplexer. Tunable or reconfigurable scheme may be applicable in multi-band multi-standard communication systems. Tunability or reconfigurability may be in response to a change in the desired frequency bands or standards. It might be in response to desired or undesired changes.

Figure 16:
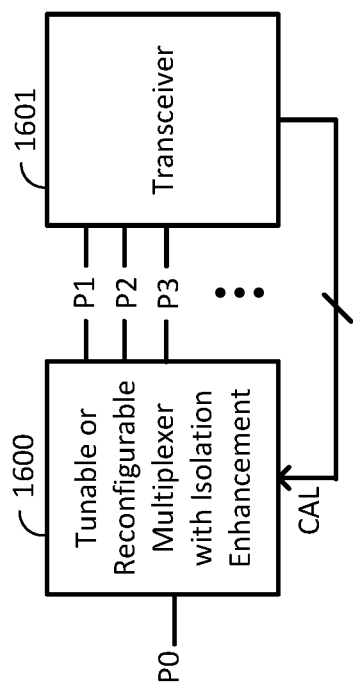
FIG. 16 shows an embodiment of a tunable or reconfigurable multiplexer with a tunable or reconfigurable isolation enhancement in conjunction with a communication transceiver.

FIG. 16 shows an embodiment of a tunable or reconfigurable multiplexer with isolation enhancement 1600 that interfaces with transceiver 1601. Port P0 of the multiplexer with isolation enhancement 1600 may correspond to an antenna interface. Ports P1, P2, P3, . . . may correspond to transmit or receive frequency bands. Transceiver may send certain information CAL to the tunable or reconfigurable multiplexer with isolation enhancement. This information, for instance, may correspond to locations of frequency bands or quality of information captured or processed in the transceiver. This information, for instance, may be applied to the variable blocks of the multiplexer with isolation enhancement. This scheme may be applicable to multi-band multi-standard communication systems. Tunability or reconfigurability may be in response to a change in the desired frequency bands or standards. It might be in response to desired or undesired changes. In an example operation, one or more of the tunable components in the multiplexer 1600 may be tuned with an application of at least one electrical stimulus. The at least one electrical stimulus may be provided by the transceiver 1601 according to the information captured by the transceiver 1601 or processed by a signal processor in the transceiver 1601.

Figure 17:
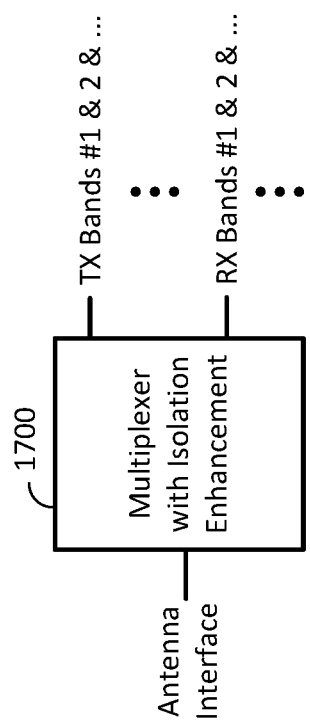
FIG. 17 shows another application of the RF multiplexer with isolation enhancement in the front-end of a multi-band communication system.

FIG. 17 shows an embodiment of a multiplexer with isolation enhancement 1700 that interfaces a number of transmit and receive frequency bands to a common antenna interface. In this embodiment, each port of the multiplexer with isolation enhancement 1700 may correspond to multiple receive or transmit frequency bands. Frequency bands corresponding to the same port may be adjacent, close, or far from each other. This scheme may facilitate a more effective interface to a transmitter, receive, or transceiver. For instance, multiple bands may be more effectively interfaced with a single amplifier in the receiver or transmitter paths.

Figure 18:
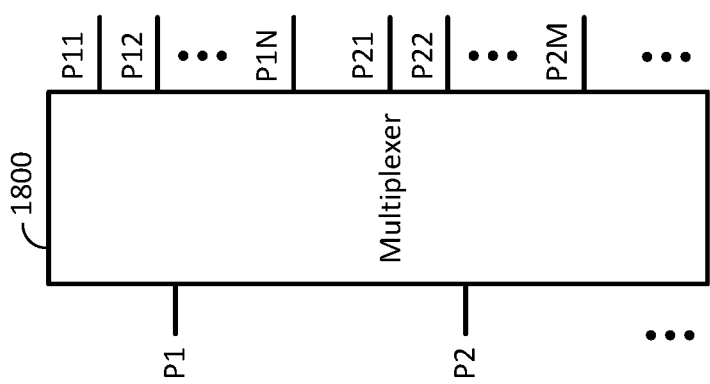
FIG. 18 shows an embodiment of an N×M RF multiplexer with N input and N×M output ports.

FIG. 18 shows an embodiment of a multiplexer 1800 that interfaces multiple common ports P1, P2, . . . to a set of other ports P11, P12, . . . , P1N, and P21, P22, . . . , P2M, and . . . . This scheme may be applicable, for instance, to a multi-antenna communication system where each common port P1, P2, . . . corresponds to an antenna interface. Ports P11, P12, . . . , P1N may correspond to information at bands 1, 2, . . . , N, respectively, intended for port P1. Ports P21, P22, . . . , P2M may correspond to information at bands 1, 2, . . . , M, respectively, intended for port P2. In such a scheme, the isolation between any two pair of the information bands (P11, P12, . . . , P1N, P21, P22, . . . , P2M), whether they correspond to the same antenna or not, should be high. Therefore, the proposed isolation enhancement scheme may be applied to all pairs of information bands.

Figure 19:
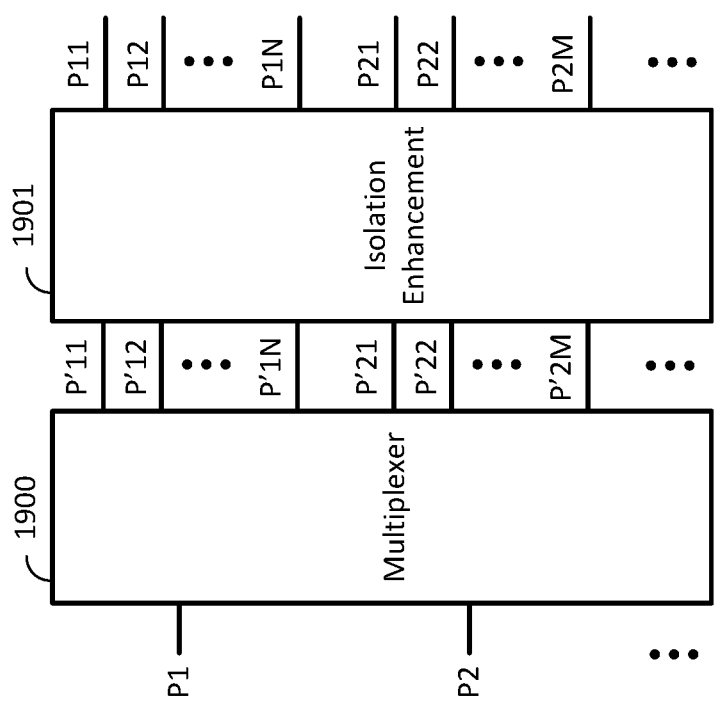
FIG. 19 shows an embodiment of an N×M RF multiplexer with isolation enhancement network with N input and N×M output ports.

FIG. 19 shows an embodiment of a multiplexer 1900 that couples to isolation enhancement network 1901 through ports P'11, P'12, . . . , P1N, P'21, P'22, . . . , P'2M, . . . . This scheme may be applicable, for instance, to a multi-antenna communication system where each port P1, P2, . . . corresponds to an antenna interface. Ports P11, P12, . . . , P1N may correspond to information at bands 1, 2, . . . , N, respectively, intended for port P1. Ports P21, P22, . . . , P2M may correspond to information at bands 1, 2, . . . , M, respectively, intended for port P2. The isolation enhancement network 1901 enhances the isolation not only between ports that correspond to each antenna interface port, but also between ports that correspond to different antenna interface ports. It should be noted that the requirements for the building blocks that enhance the isolation between the ports corresponding to the same antenna may be very different compared to those corresponding to different antennas. For instance, a common leakage path between ports corresponding to different antenna is through the electromagnetic radiation (antenna coupling). An unwanted leakage signal through this path may undergo a large propagation delay that may lead to the requirement for large time delay blocks in the isolation enhancement block. It is noted that multiplexer 1900 may be constructed of individual blocks. For instance, multiplexer 1900 may be constructed out of a few duplexers. Likewise, isolation enhancement network 1901 may be constructed of individual blocks. As one example, consider a special case of a two antenna FDD system such as a 2×2 multi input multi output (MIMO) FDD scheme. Such a system may have two antennas coupled to two transceivers (or a 2×2 MIMO transceiver). In other words, this will be a two antenna system with four ports corresponding to two transmitters and two receivers. A separate duplexer may be used for each of the two antennas. While the isolation between the transmit and receive ports of each duplexer may be sufficient; but, the signals from a transmitter corresponding to either antenna may leak to the receiver corresponding to the other antenna. This unwanted coupling may be through the air (antenna coupling). In this example, the isolation enhancement network should compensate for such unwanted leakage to ensure sufficient isolation between each transmitter and both receivers.

Figure 20:
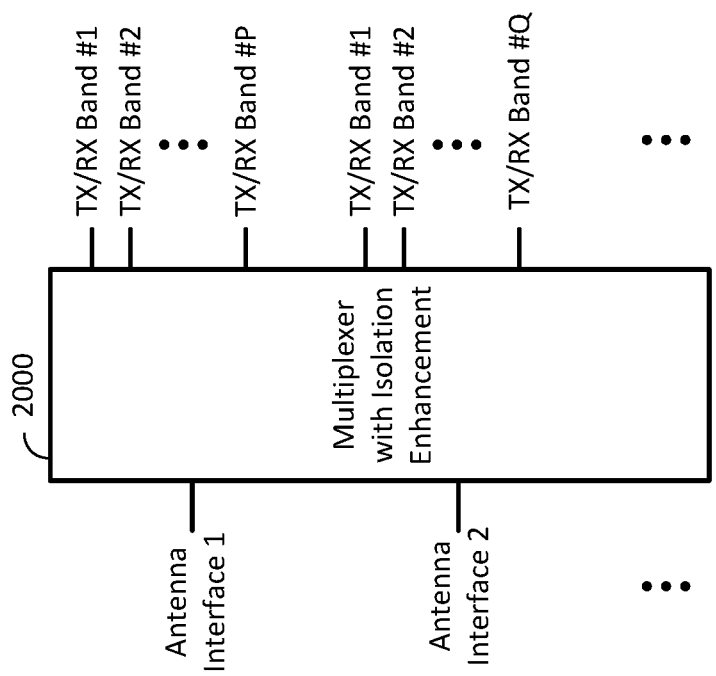
FIG. 20 shows an embodiment of an N×M RF multiplexer with isolation enhancement network in the front-end of a multi-band communication system that supports N antenna ports and N×M transmit/receive ports.

FIG. 20 illustrates an embodiment of multiplexer with isolation enhancement 2000 that interfaces with antenna interface ports designated as Antenna Interface 1, Antenna Interface 2, . . . and a number of transmit/receive ports designated as TX/RX Band #1, TX/RX Band #2, . . . , TX/RX Band #P, corresponding to Antenna Interface 1, TX/RX Band #1, TX/RX Band #2, . . . , TX/RX Band #0, corresponding to Antenna Interface 2, . . . .

Figure 21:
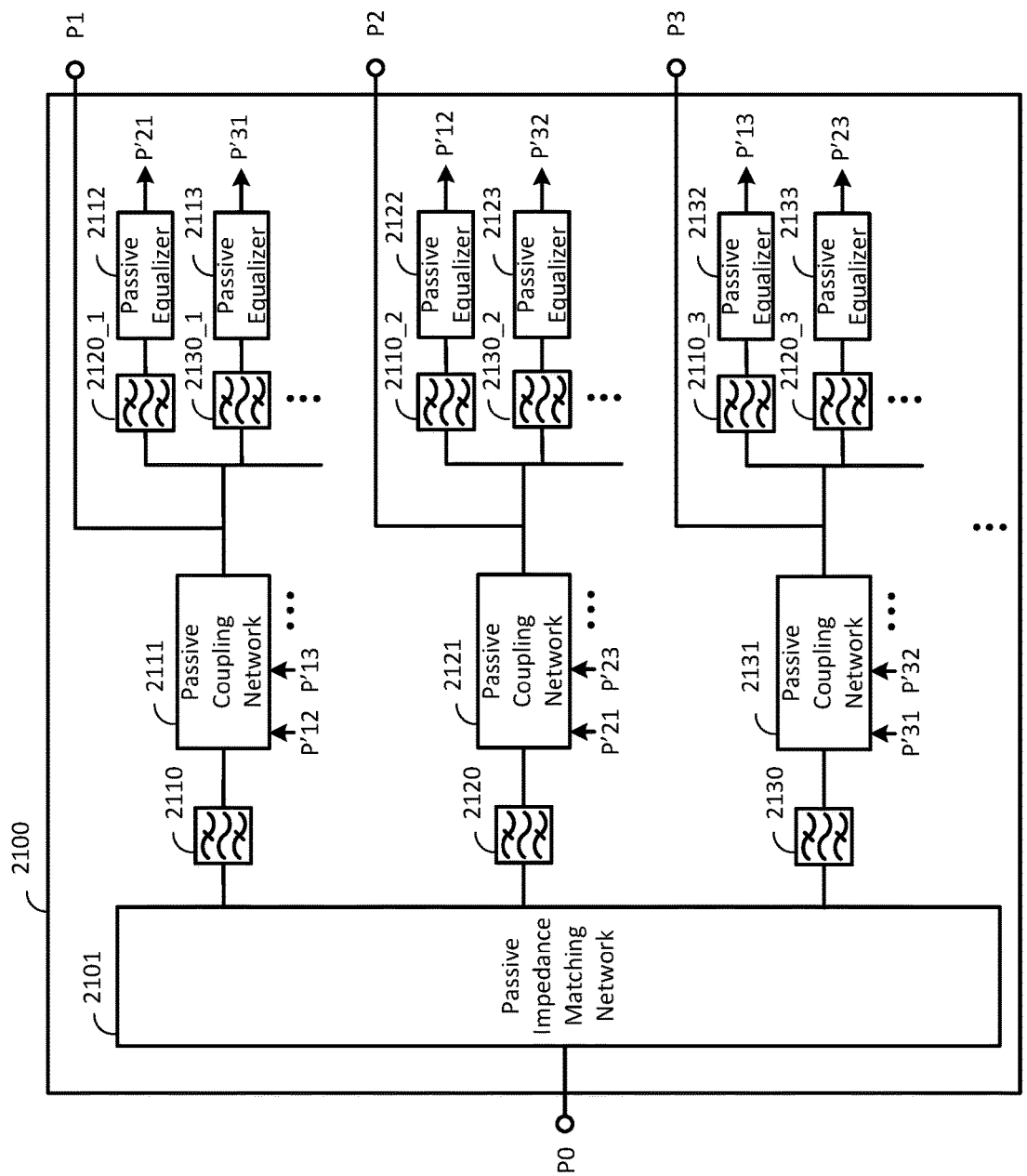
FIG. 21 shows an embodiment of an RF multiplexer with isolation enhancement network.

FIG. 21 illustrates an embodiment of a multiplexer with isolation enhancement 2100 that interfaces common port P0 with ports P1, P2, P3, . . . . The multiplexer includes band-select filters 2110, 2120, 2130, . . . , each corresponding to a specific range of frequencies. A general passive network (e.g., passive impedance matching network 2101) enables connection of the filters to the common port P0. This network 2101 may improve impedance matching, enhance isolation, provide additional filtering, etc. Isolation enhancement is applied to ports P1, P2, P3, . . . . Each port interfaces with other ports through parallel combination of filters and equalizers. For instance, port P1 interfaces with port P2 through filter 2120_1 and passive equalizer 2112, and ultimately a passive coupling network 2121. In one embodiment, filter 2120_1 may be designed to have a similar or substantially the same frequency response as filter 2120. Passive equalizer 2112 may be designed to align the signals in the cancellation paths in phase, amplitude, and delay with the originally leaked signal between ports P1 and P2 at frequency range of interest. Likewise, port P1 interfaces with port P2 through filter 2130_1 and passive equalizer 2113, and ultimately a passive coupling network 2131. In one embodiment, filter 2130_1 may be designed to have a similar or substantially the same frequency response as filter 2130. Passive equalizer 2113 may be designed to align the signals in the cancellation paths in phase, amplitude, and delay with the originally leaked signal between ports P1 and P3 at frequency range of interest. Similar isolation enhancement paths between other ports are also included.

In an example embodiment, all components in the multiplex 2100 may be integrated in a single package. In another example embodiment, the multiplexer 2100 may be integrated with one or more of the following in the same package: one or more radio frequency amplifiers, one or more radio frequency switches, one or more radio frequency filters, and one or more other radio frequency multiplexers.

Figure 22:
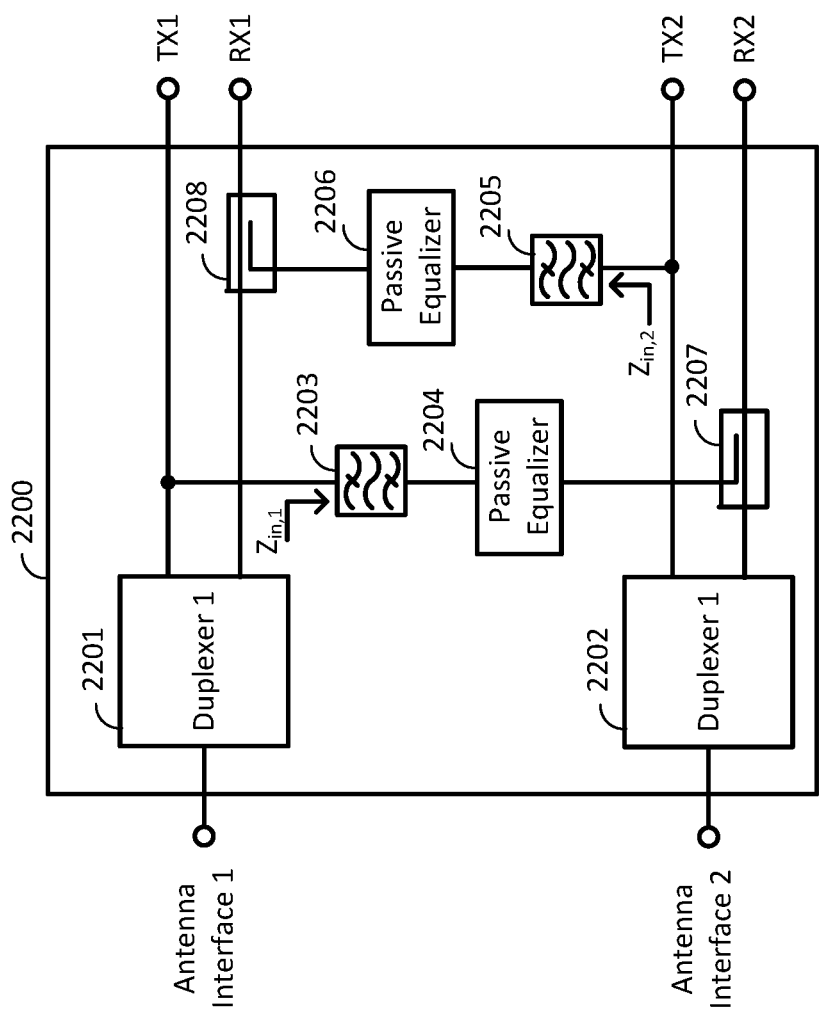
FIG. 22 shows an embodiment of a radio frequency front-end of a two-antenna FDD scheme with isolation enhancement.

FIG. 22 illustrates an embodiment of an radio frequency front-end 2200 of a two-antenna FDD scheme with isolation enhancement. The RF front-end 2200 interfaces with two antenna interfaces, namely, antenna interface 1 and antenna interface 2, to two pairs of transmit and receive ports specified as TX1, RX1, TX2, and RX2. For instance, this front-end 2200 may be applied to a 2×2 MIMO scheme that supports frequency division duplexing. In this example, frequency duplexers 2201 and 2202 provide sufficient isolation between their transmit and receive ports. In other words, there is sufficient isolation between ports TX1 and RX1 of duplexer 2201, and there is sufficient isolation between ports TX2 and RX2 of duplexer 2202. However, there may not be sufficient isolation between ports TX1 and RX2, or between ports TX2 and RX1. Isolation enhancement networks which comprise filters 2203 and 2205, and passive equalizers 2204 and 2206 enhance the isolation between these ports. Filters 2203 and 2205 offer high input impedances ($Z_{in,1}$ and $Z_{in,2}$) at the transmit frequencies and low input impedance at the receive frequencies. Passive equalizers 2204 and 2206 ensure that the transfer function of the cancellation paths is similar (or very close) to that of the leakage paths at the receive frequencies. More networks may be added between the ports to enhance the isolation further and at different frequencies.

It is noted that the scheme need not have identical features or topologies with respect to various ports. For instance, the number and topologies of filters, passive equalizers, and passive coupling networks need not be the same for different ports P1, P2, P3, . . . . For instance, the inherent isolation between various multiplexer ports (prior to the application of the isolation enhancement) may be different among different ports, requiring different levels of enhancement. For instance, the required isolation between various ports may be different and application- or standard-dependent.

It is noted that, while in many applications passive realization of the multiplexer with enhanced isolation may be preferred for noise and linearity reasons, the methods of this disclosure are applicable to schemes that may include active elements. For instance, active components may be used in filters, equalizers, impedance matching networks, and coupling networks. Furthermore, if variable components are utilized in, for instance, tunable or reconfigurable filters or isolation enhancement networks, they may include active components to enable tunability or reconfigurability.

Other embodiments of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for enhancing isolation in RF multiplexers.

Accordingly, aspects of the present disclosure may be realized in hardware, software, or a combination of hardware and software. The present disclosure may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Aspects of the present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

What is claimed is:

1. A radio frequency multiplexer circuit, comprising:
a common port;
N ports, wherein N is a positive integer of at least two ports;
at least N first radio frequency filters, wherein each of the at least N first radio frequency filters is in a path connecting the common port to one of the N ports, and
a set of circuit networks, wherein:
each circuit network comprises a second radio frequency filter and a radio frequency equalizer, wherein the radio frequency equalizer is configured to modify amplitude, phase, or delay responses of a signal, which is filtered by a corresponding second radio frequency filter at a frequency range of interest; and
each circuit network is in a path connecting two ports of the N ports in a configuration that enhances isolation between the two ports of the N ports.

2. The radio frequency multiplexer of claim 1 wherein the second radio frequency filter of each circuit network and one of the at least N first radio frequency filters have a same frequency response.

3. The radio frequency multiplexer of claim 1 wherein the radio frequency equalizer comprises one or more parallel paths, and each parallel path comprises two or more of the following: a radio frequency attenuator, a radio frequency phase shifter, and a radio frequency delay element.

4. The radio frequency multiplexer of claim 3 wherein one or more of the radio frequency attenuator, the radio frequency phase shifter, and the radio frequency delay element in one or more of the parallel path are tunable.

5. The radio frequency multiplexer of claim 3 wherein a group delay associated with a narrowband circuit at a frequency band or frequency bands of interest is used in a realization of one or more of the radio frequency delay elements.

6. The radio frequency multiplexer of claim 1 wherein the radio frequency multiplexer comprises only passive components.

7. The radio frequency multiplexer of claim 1 wherein one or more of the radio frequency multiplexer components are tuned with an application of at least one electrical stimulus.

8. The radio frequency multiplexer of claim 7 wherein at least one electrical stimulus is provided by a wireless transceiver or a signal processor.

9. The radio frequency multiplexer of claim 1 wherein the radio frequency multiplexer components are integrated in a single package.

10. The radio frequency multiplexer of claim 1 wherein the radio frequency multiplexer is integrated with one or more of the following in the same package: one or more radio frequency amplifiers, one or more radio frequency switches, one or more radio frequency filters, and one or more other radio frequency multiplexers.

11. The radio frequency multiplexer of claim 1 wherein the at least N first radio frequency filters correspond to transmit or receive frequency bands of a communication system.

12. The radio frequency multiplexer of claim 1 wherein the radio frequency multiplexer is configured to support carrier aggregation in a wireless communication standard.

13. The radio frequency multiplexer of claim 1 wherein the radio frequency multiplexer is configured to support a frequency division duplex communication system.

14. The radio frequency multiplexer of claim 1 wherein the radio frequency multiplexer is used in a hand-portable platform supporting wireless communication.

15. The radio frequency multiplexer of claim 1 wherein the radio frequency multiplexer is part of a wireless communication base station.

16. The radio frequency multiplexer of claim 1 wherein the common port corresponds to an antenna port, and the N ports correspond to transmit and receive ports of a communication system.

17. A radio frequency multiplexer circuit in support of multi antenna communication systems, comprising:
M common ports corresponding to a plurality of M-antennas, where M is a positive integer of at least two ports;
N×M ports, where N is a positive integer of the at least two ports;
at least N×M first radio frequency filters, wherein each of the at least N×M first radio frequency filters is in a path connecting one of the M common ports to one of the N ports; and
a set of circuit networks, wherein:
each circuit network comprises a second radio frequency filter and a radio frequency equalizer, wherein the radio frequency equalizer is configured to modify amplitude, phase, or delay responses of a signal, which is filtered by a corresponding second radio frequency filter at a frequency range of interest; and
each circuit network is in a path connecting two ports of the N×M ports in a configuration that enhances isolation between the two ports of the N×M ports.

18. The radio frequency multiplexer of claim 17 wherein the radio frequency equalizer comprises one or more parallel paths, and each parallel path comprises two or more of the following: a radio frequency attenuator, a radio frequency phase shifter, and a radio frequency delay element.

19. The radio frequency multiplexer of claim 18 wherein one or more of the radio frequency attenuator, the radio frequency phase shifter, and the radio frequency delay element in one or more of the parallel path are tunable.

20. The radio frequency multiplexer of claim 18 wherein a group delay associated with a narrowband circuit at a frequency band or frequency bands of interest is used in a realization of one or more of the radio frequency delay elements.

* * * * *

UNITED STATES PATENT AND TRADEMARK OFFICE
CERTIFICATE OF CORRECTION

PATENT NO. : 10,581,650 B2  
APPLICATION NO. : 15/220181  
DATED : March 3, 2020  
INVENTOR(S) : Hossein Hashemi et al.

Page 1 of 1

It is certified that error appears in the above-identified patent and that said Letters Patent is hereby corrected as shown below:

In the Specification

In Column 8, Lines 24 and 28, replace "ISA" with --$|S_{31}|$--.
In Column 12, Line 36, replace "PIN" with --P'1N--.
In Column 13, Line 15, replace "TX/RX Band #0" with --TX/RX Band #Q--.

Signed and Sealed this  
Fifth Day of May, 2020

Andrei Iancu  
*Director of the United States Patent and Trademark Office*